H. A. AVERY.
Plow and Grain Drill.
No. 206,069.        Patented July 16, 1878.
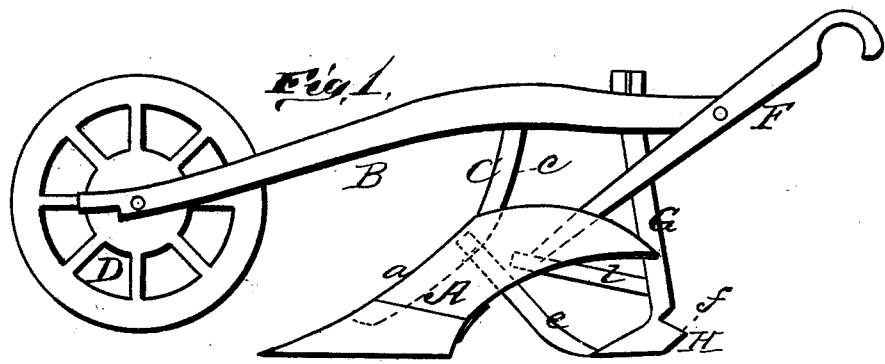
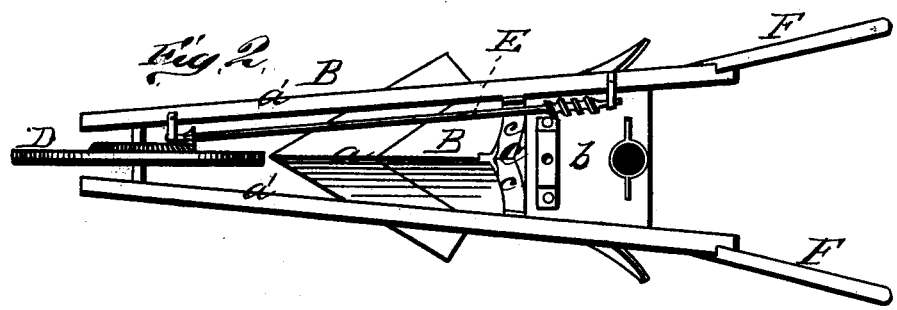
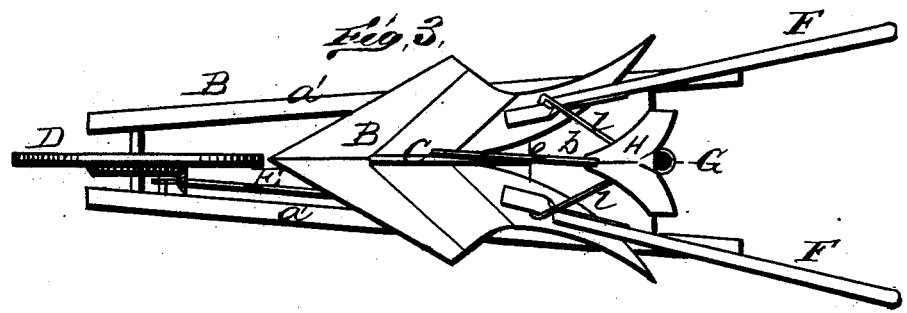
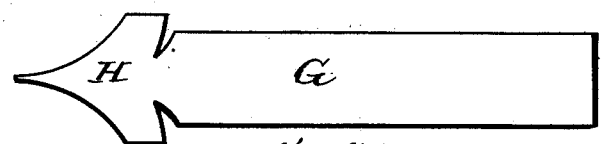
WITNESSES
E. H. Bates
F. J. Masi.
INVENTOR
Homer A. Avery,
by E. W. Anderson.
ATTORNEY

UNITED STATES PATENT OFFICE.

HOMER A. AVERY, OF MARYVILLE, MISSOURI.

IMPROVEMENT IN PLOW AND GRAIN-DRILL.

Specification forming part of Letters Patent No. 206,069, dated July 16, 1878; application filed May 25, 1878.

*To all whom it may concern:*

Be it known that I, HOMER A. AVERY, of Maryville, in the county of Nodaway and State of Missouri, have invented a new and valuable Improvement in Listing-Plow and Seed-Drill; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my improved plow. Fig. 2 is a top view of the same. Fig. 3 is a bottom view thereof, and Fig. 4 detail view of the blank out of which the spout and subsoil-shovel are formed.

This invention has relation to improvements in combined corn-drill and plow.

The nature of the invention consists in the arrangement and novel construction of the parts of the plow and drill, and in connection therewith of a subsoiler in rear of the plow, that not only loosens up the soil, but throws it upon the seed, as will be hereinafter more fully set forth.

In the annexed drawings, the letter A designates a double plow, throwing the furrow-slice both ways from its cutting edge or ridge $a$, and connected to the beam B by means of the standard C. The beam B is composed of two beams, $a'$, connected together near their rear ends by a platform, $b$, upon which the seed-hopper is designed to be mounted, and converged until they nearly meet at their front ends, where a driving-wheel, D, is mounted, that, through a connecting-rod, E, and suitable gearing, conveys motion to the seed-slide in the hopper.

The plow is braced to the ends of the beams $a$ by means of the handles F, that are rigidly secured both to the said plow and beams, and its standard above the mold-boards has diverging branches $c$, secured, the one to one of the beams, $a'$, and the other to the other of said beams. The plow is thus rendered very stiff and incapable of lateral displacement.

In rear of the plow, and extending through the platform $b$ into the hopper, is a spout, G, carrying on its lower end a subsoil-shovel, H, the ridge of which is in line with that of the plow, and is connected to the same by means of a divider-plate, $e$. The wings $f$ of the subsoiler extend as far as, or even farther than, the rear edge of the spout. This shovel is slightly inclined, as shown in Fig. 1, and works under the surface of the bottom of the furrow, loosening the soil, and, as it advances, raising it up and projecting it from its rear edge upon the corn dropped from the spout, thus covering it up. The spout and shovel are formed in one piece, and it is braced to the wings of the plow by means of the rods $l$.

What I claim as new, and desire to secure by Letters Patent, is—

The combination, with the double beam B, having a seed-dropper mechanism, and a double plow A, of the spout G, the subsoil-shovel on the end of the said spout, and a dividing-blade connecting the plow and shovel, substantially as specified.

In testimony that I claim the above I have hereunto subscribed my name in the presence of two witnesses.

HOMER A. AVERY.

Witnesses:
   THEODORE F. JONES,
   ROBT. C. MONTGOMERY.